US007190407B2

(12) United States Patent
Reneau

(10) Patent No.: US 7,190,407 B2
(45) Date of Patent: Mar. 13, 2007

(54) SYSTEM, METHOD AND APPARATUS FOR SANDCASTLE SIGNAL GENERATION IN A TELEVISION SIGNAL PROCESSING DEVICE

(75) Inventor: Daniel Lee Reneau, Fishers, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 528 days.

(21) Appl. No.: 10/311,033

(22) PCT Filed: Jun. 26, 2001

(86) PCT No.: PCT/US01/20441

§ 371 (c)(1),
(2), (4) Date: Dec. 10, 2002

(87) PCT Pub. No.: WO02/01854

PCT Pub. Date: Jan. 3, 2002

(65) Prior Publication Data

US 2004/0125233 A1    Jul. 1, 2004

Related U.S. Application Data

(60) Provisional application No. 60/214,652, filed on Jun. 26, 2000.

(51) Int. Cl.
*H04N 5/06* (2006.01)
*H04N 5/08* (2006.01)
(52) U.S. Cl. ..................... 348/525; 348/521
(58) Field of Classification Search .............. 348/521, 348/501, 525, 634, 637
See application file for complete search history.

(56) References Cited

U.S. PATENT DOCUMENTS

| 4,056,826 | A | * | 11/1977 | Watanabe et al. | 348/505 |
|---|---|---|---|---|---|
| 4,069,504 | A | * | 1/1978 | Jolivet et al. | 348/495 |
| 4,172,262 | A | * | 10/1979 | Hosoya | 348/605 |
| 4,228,456 | A | * | 10/1980 | Lovely | 348/506 |
| 4,263,610 | A | * | 4/1981 | Shanley et al. | 348/506 |
| 4,313,130 | A | | 1/1982 | Yost | 358/21 |
| 4,316,214 | A | | 2/1982 | Yost | 358/21 |
| 4,319,277 | A | * | 3/1982 | Nicholson et al. | 348/634 |
| 4,337,478 | A | | 6/1982 | Harlan | 358/20 |
| 4,549,202 | A | * | 10/1985 | Hettiger | 348/496 |
| 4,661,844 | A | * | 4/1987 | Rufray et al. | 348/557 |
| 4,748,505 | A | * | 5/1988 | Smeulers et al. | 348/547 |
| 4,968,919 | A | * | 11/1990 | Oliver | 315/371 |

FOREIGN PATENT DOCUMENTS

DE     4139802     6/1993

* cited by examiner

*Primary Examiner*—Victor R. Kostak
(74) *Attorney, Agent, or Firm*—Joseph J. Laks; Robert D. Shedd; William A. Lagoni

(57) ABSTRACT

A system, method and apparatus are provided for generating 98 a sandcastle signal in a television signal receiver 90, and utilizing the sandcastle signal during television signal processing. In one form, the sandcastle signal is generated by subtracting a separated synchronization signal of a television signal from a deflection retrace signal of the television signal receiver. In another form, the sandcastle signal is generated in a television and includes subtracting a separated synchronization pulse from a horizontal flyback pulse, a vertical retrace pulse, or a composite pulse formed by summation of a horizontal flyback pulse and a vertical retrace pulse. The sandcastle signal may be utilized by the television signal receiver 90 during a function of the television signal receiver 90, such as during a channel change.

19 Claims, 9 Drawing Sheets

SYSTEM, METHOD AND APPARATUS FOR SANDCASTLE SIGNAL GENERATION IN A TELEVISION SIGNAL PROCESSING DEVICE

This application claims the benefit under 35 U.S.C. § 365 of International Application PCT/US01/20441, filed Jun. 26, 2001, which was published in accordance with PCT Article 21 (2) on Jan. 3, 2002 in English; and which claims benefit of U.S. provisional application Ser. No. 60/214,652 filed Jun. 26, 2000.

BACKGROUND OF THE INVENTION

1. Field of the Invention

The present invention relates to television signal processing and, more particularly, to the generation and use of signals for television signal processing.

2. Description of the Related Art

Televisions and other types of television signal processing devices of today utilize a variety of integrated circuits, circuitry, and/or logic to provide necessary processing of television signals. Both analog and digital television signals require fairly extensive processing from receipt of the television signals to eventual display on a display device associated with the television/television signal processing device and audio output or reproduction. Such extensive processing typically correlates to extensive circuitry and/or logic for accomplishing such processing. A currently common practice in television engineering, as well as consumer electronics engineering in general, is to consolidate processing functionality. This has the advantage of reducing the space necessary for such processing circuitry/logic. Reducing circuitry/logic space is a desirable result for many reasons.

With regard to signal processing, various signals are utilized and/or generated by the processing circuitry during processing of a television signal. One such generated signal is a sandcastle signal. A sandcastle signal is a combination timing and control signal that is typically used in television signal processing, particularly analog television signal processing. A conventional sandcastle signal, as depicted in FIG. 1, reference being now made thereto, comprises a combination of pulses of different levels or voltages.

In FIG. 1, a typical sandcastle signal, generally designated 10 is shown in timing relationship with a horizontal video signal of a television signal, generally designated 20. The sandcastle signal 10 includes a first pulse or portion 12 of a first given length of time and of a first given voltage, a second pulse or portion 14 of a second given length of time and of a second given voltage, and a third pulse or portion 16 of a third given length of time and of a third given voltage. The sandcastle signal 10 is provided during the blanking interval 22 of the horizontal video signal 20. Thus, the pulses or portions 12, 14, and 16, comprise the sandcastle signal 10 and are provided during the blanking interval 22.

For comparison, the horizontal video signal 20 has a blanking interval portion 22 during which a color burst interval 26 of color burst data is provided. After the blanking interval 22, the video signal 20 has an active scan interval 24 in which video data are provided for processing.

During interval 18, the sandcastle signal is below both the blanking and keying thresholds. Therefore, the sandcastle repeats with a new period during each horizontal line of the vertical field. In a similar manner, the sandcastle signal contains a vertical blanking interval wherein the level of the sandcastle signal is held at an intermediate level during vertical blanking.

The sandcastle signal as shown is used to control horizontal and vertical retrace blanking of the luminance and chrominance output signals, disabling of the black stretch negative peak detector, sampling of the color burst signal in an automatic color control (ACC), and chroma subcarrier regenerator (color PLL (Phase Lock Loop)), and keying of the luminance back porch clamp (clamp key). These functions are shown in block form in FIG. 2.

FIG. 2 shows a block diagram depiction of the use of the sandcastle signal 10. The sandcastle signal 10 is fed to a positive (+) input of a first comparator 32 and a positive input of a second comparator 34. A negative (−) input of the comparator 32 is maintained in a high state (logic level 1) by being tied to a first battery 36a. A negative (−) input of the comparator 34 is maintained in a high state (logic level 1) by being tied to a second battery 36b.

The comparator 32 includes an output 38 that is split into a first output 38a and a second output 38b. The first output 38a is in communication with burst-gate circuitry/logic, an ACC portion, and a chroma PLL portion of the processing circuitry. The comparator 34 includes an output 40 that is the blanking pulse to disable the luma output and black stretch negative peak detector.

A conventional manner of generating and using a sandcastle signal or pulse 10 is shown in FIG. 3, of which reference is now made, that represents by way of a block diagram a television signal processing circuitry/logic, generally designated 50. The television signal processing circuitry/logic 50 may be utilized in any type of consumer electronic device, particularly a television signal processing device and, more particularly, a television with or without an integral display. The television signal processing circuitry/logic 50 includes a sandcastle generation circuitry/logic portion (generator) 51 and a video processing circuitry/logic portion 70.

The sandcastle generator 51 is operative to receive a horizontal flyback pulse or signal and generate a horizontal blanking pulse, to receive a vertical retrace pulse or signal and generate a vertical blanking pulse, and to receive a composite video and sync pulse or signal and generate a burst-gate/clamp-key signal. Each incoming pulse or signal is received from other appropriate circuitry/logic, not shown, of the processing circuitry/logic 50.

The horizontal flyback pulse is received into signal clipper circuitry/logic 52 that processes the incoming signal appropriately and provides an output signal to timing/control circuitry/logic 54 to thereby generate a horizontal blanking pulse. The vertical retrace pulse is received in a signal clipper 56 that processes the incoming signal appropriately and provides an output signal to a vertical oscillator 58. The mixed signal from the vertical oscillator 58 provides a vertical scan signal and an output signal to timing/control circuitry/logic 60 to thereby generate a vertical blanking pulse. The composite video and sync pulse is input to a sync separator 62 that processes the composite video and sync pulse appropriately and provides an output signal to a horizontal phase-locked loop (PLL) 64. The horizontal PLL 64 also receives the output signal from the clipper 52 such that a horizontal scan signal is produced as well as an output signal that is provided to timing/control circuitry/logic 66. The timing control circuitry/logic 66 also receives the sync separator output, which, together with the horizontal PLL output signal, provides a burst-gate/clamp-key signal. The horizontal blanking pulse, the vertical blanking pulse, and the burst-gate/clamp-key signal are summed in summer circuitry/logic 68 to provide an output signal that is the sandcastle ("S.C." in FIG. 3) signal.

The video processing circuitry/logic 70 receives the composite video and sync signal and processes the signal in luma/chroma separation filter circuitry/logic 72. The luma portion of the output signal of the luma/chroma separation filter circuitry/logic 72 is input into luma processing circuitry/logic 74 which, along with the clamp-key signal and blanking signals provides a luma processed output signal. The chroma portion of the output signal of the luma/chroma separation filter circuitry/logic 72 is input into chroma processing circuitry/logic 78 and color PLL circuitry/logic 80 which, along with the burst-gate signal, provides chroma processed output signals. Adding or mixing circuitry/logic 76 receives the luma processed output signal and the chroma processed output signals, which, along with blanking signals, provides R,G,B video output signals.

In view of the above, various unintended problems or consequences can occur within the consumer electronic device. These unintended problems may become evident only when the device is in use. One such problem that occurs in some televisions is a bright flash on the display during channel change. Typically, these televisions are operative to process analog television signals utilizing an attenuated flyback voltage to key a video clamp (video clamping circuit) for the display. The video clamp sets the black level of an analog television signal to a constant DC voltage. This is done so that the blanking bar associated with clamping is during horizontal deflection retrace. The flyback remains as the clamp pulse, after the video reappears after the channel change. The sync tip of the analog television signal is then clamped. When the standard sandcastle is switched in, the clamping moves from the sync tip to the back porch of the sync signal portion of the analog television signal. Any noticeable delay is typically due to a black stretch feature. Thus, it would be desirable to reduce and/or eliminate the flash that occurs on the television display during channel change. Of course, it would be desirable to reduce and/or eliminate other undesirable effects that may be produced during television signal processing and/or during various functions of a television signal receiver having television processing circuitry/logic, in addition to the one described in detail above.

SUMMARY OF THE INVENTION

According to an aspect of the present invention, there is provided a system, method and apparatus for generating a sandcastle signal especially for use in a television signal receiver.

In one form, there is provided an apparatus for generating a sandcastle signal. The apparatus includes circuitry operative to provide an attenuated deflection retrace signal, circuitry operative to provide a separated synchronization signal, and circuitry operative to subtract a portion of the separated synchronization signal from the attenuated deflection signal resulting in a sandcastle signal.

In another form of the present invention, there is provided a method of generating a sandcastle signal in a television signal receiver. The method includes the steps of: (a) generating an attenuated deflection retrace signal derived from a television signal; (b) providing a separated synchronization signal derived from the television signal; and (c) subtracting a portion of the separated synchronization signal from the attenuated deflection retrace signal to result in a sandcastle signal.

In yet another form of the present invention, there is provided a television signal receiver. The television signal receiver includes means for providing an attenuated deflection signal, means for providing a separated synchronization signal, and means for subtracting a portion of the separated synchronization signal from the attenuated deflection signal, resulting in a sandcastle signal.

The attenuated deflection signal may be a horizontal flyback signal, a vertical deflection retrace signal, or a combination of a horizontal flyback signal and a vertical deflection retrace signal. The generated flyback signal may be provided during a function of the television signal receiver.

According to another aspect of the present invention, there is provided a system, apparatus and method of selectively suppressing at least a portion of a clamping pulse in an analog television signal processor, especially during a time period when the analog television signal processor is performing a television-related function, such as when changing a channel.

More particularly, in one form, a signal is provided to the clamp key input of a clamping circuit of the television signal processor during performance of a television signal processor-related function such as a channel change, to lower the voltage of at least a portion of the clamping pulse. The resulting voltage level (notch) of the clamping pulse is below a clamp threshold of the clamping circuitry. Additionally, the resulting voltage level is above a black stretch detector defeat threshold of the television signal processor. Therefore, the clamp will be disabled during synchronization while the black stretch detector will not be defeated. In the case where the television signal processor-related function is a channel change, this results in a reduction, suppression, and/or elimination of a display flash during the channel change.

BRIEF DESCRIPTION OF THE DRAWINGS

The above-mentioned and other features and advantages of this invention, and the manner of attaining them, will become more apparent and the invention will be better understood by reference to the following description of embodiments of the present invention in various forms taken in conjunction with the accompanying drawings, wherein.

Corresponding reference characters indicate corresponding parts throughout the several views.

DETAILED DESCRIPTION OF THE INVENTION

Figure 4:
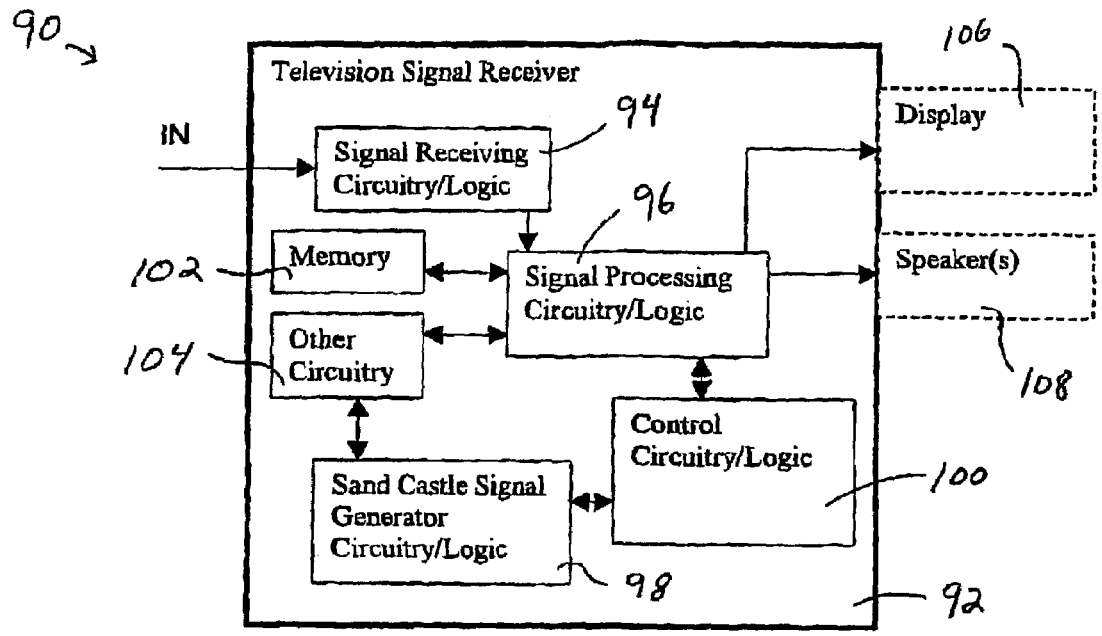
FIG. 4 is a simplified block diagram representation of a device in which the present invention may be utilized.

Referring now to the drawings and, more particularly to FIG. 4, there is depicted an exemplary television signal processing device and, more particularly, a television signal receiver and audio/visual display system, generally designated 90, in which the present invention may be generated and/or used. The system 90 includes a television signal receiver, processor or processing device 92, a display 106 that may or may not be integral with the television signal receiver 92, and a speaker or speakers 108 that may or may not be integral with the television signal receiver 92. The television signal receiver 92 may be a television, a set-top box (e.g. a cable box, satellite box, or the like), a television signal recorder (e.g. VCR, VTR, or the like), or any other device capable of receiving and utilizing television signals, particularly analog television signals.

The television signal receiver 92 includes an input (IN) that is coupled to or in communication with a source of television signals (not shown) such as a terrestrial television signal antenna, a satellite receiver, a cable television system, or the like. The input (IN) is in communication with signal receiving circuitry/logic 94. The signal receiving circuitry/logic 94 is operative to tune to a television channel, signal, or the like, as well as perform any necessary "front end" processing such as is known in the art. The television signal receiver 92 also includes signal processing circuitry/logic 96. The television signal processing circuitry/logic 96 is operative to perform signal processing to the television signal received by the signal receiving circuitry/logic 94 such as is known in the art in addition to further signal processing in accordance with the principles with the of the present invention.

In accordance with an aspect of the present invention, the television signal receiver 92 further includes sandcastle signal generation circuitry/logic 98 that is operative to generate a sandcastle signal. Control circuitry/logic 100 is also provided that is operative to cause the sandcastle signal generated by the sandcastle signal generator 98 to be provided to the signal processing circuitry/logic 96. In one form, the control circuitry/logic 100 is operative to provide the sandcastle signal to the signal processing circuitry/logic 96 when the television signal receiver 92 is performing a particular television receiver-related function. This may also occur at a time period and/or interval in which the signal processing circuitry/logic 96 is processing a synchronization signal of a television signal.

The signal processing circuitry/logic 96 is further operative to utilize the sandcastle signal generated by the sandcastle signal generator 98 to suppress, reduce, or lower the voltage of a clamping pulse/signal during a synchronization signal portion of the television signal. In this form, the synchronization signal is preferably the horizontal synchronization signal but may be the vertical synchronization signal.

The television signal receiver 92 also includes memory 102 that is operative to store program instructions for operation and/or control of the television signal receiver 92. Other circuitry 104 is also provided for other aspects, features and/or functions of the television signal receiver 92.

Figure 5:
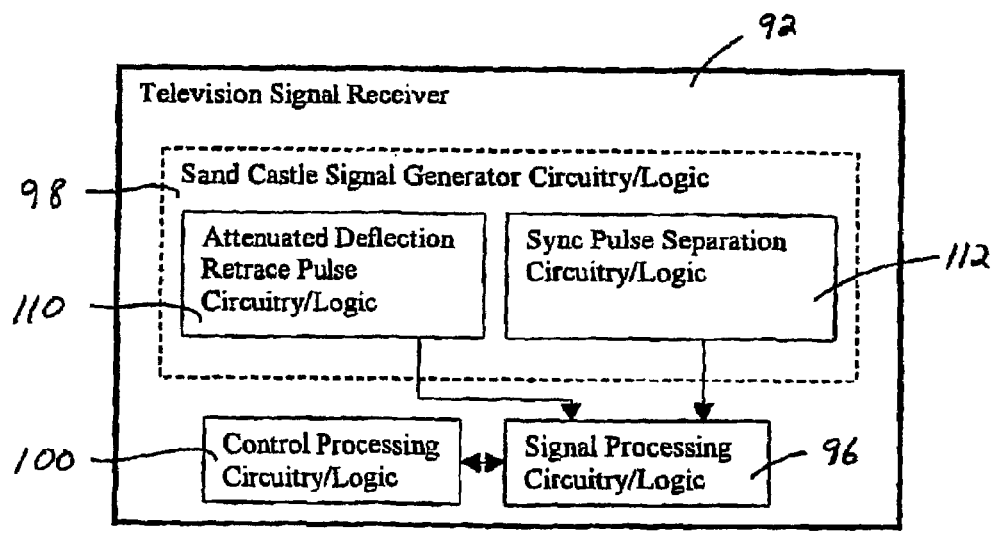
FIG. 5 is a more detailed block diagram of a portion of the device of FIG. 4.

Referring to FIG. 5, there is shown a more detailed block diagram of the sandcastle generator 98. The sandcastle generator 98 includes attenuated deflection retrace pulse circuitry/logic 110 that is operative to provide an attenuated deflection retrace pulse or signal. This may be a horizontal flyback signal, a vertical deflection retrace signal, or a combination horizontal flyback signal and vertical deflection retrace signal. The sandcastle generator 98 further includes sync pulse separation circuitry/logic 112 that is operative to separate a sync pulse from an incoming television signal.

Figure 9:
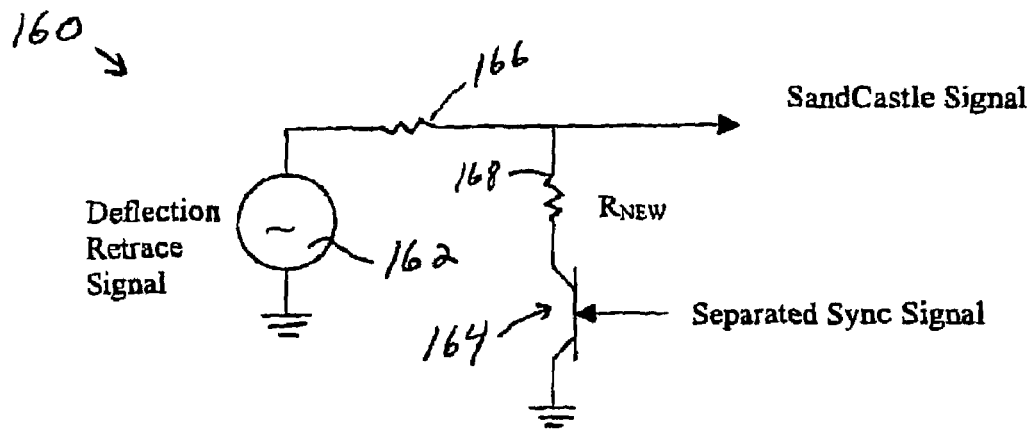
FIG. 9 is a simplified circuit diagram of an exemplary manner of generating a sandcastle signal in accordance with the principles presented herein.

The attenuated deflection retrace pulse and the separated sync pulse are input to the signal processing circuitry/logic that processes the two signals to obtain a sandcastle signal such as the sandcastle signal 152 of FIG. 9. The control circuitry/logic 100 is operative to provide control signals to the signal processing circuitry/logic 96 for use and/or application of the generated sandcastle signal.

Figure 6:
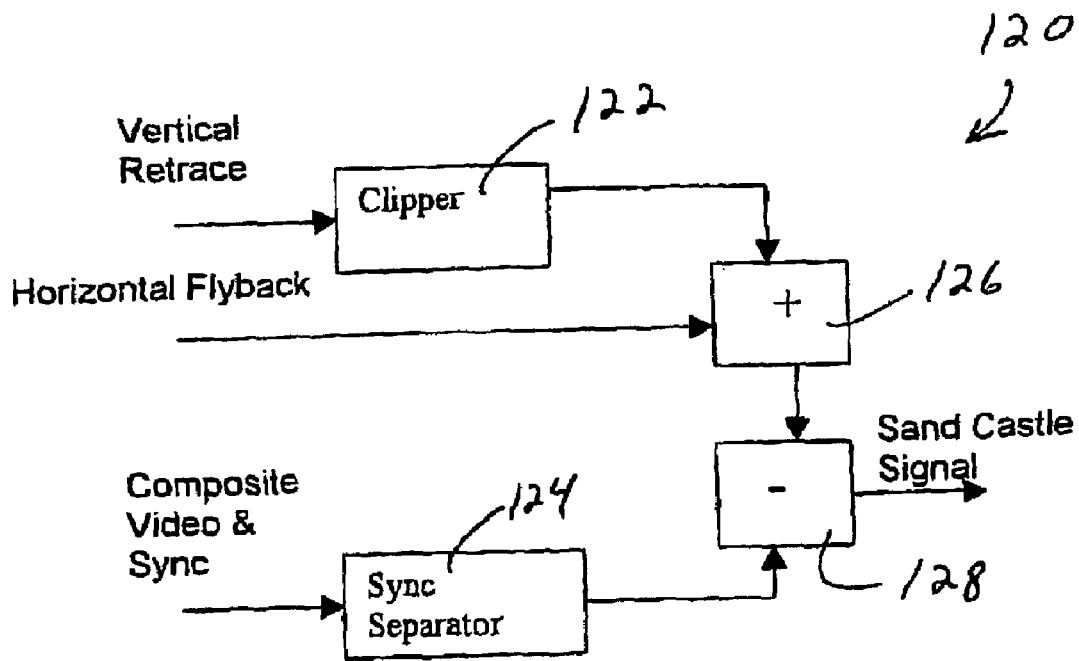
FIG. 6 is a block diagram of an implementation of a sandcastle generator in accordance with the principles of the present invention.

Referring to FIG. 6, there is shown an exemplary embodiment of a sandcastle signal generator, generally designated 120. The sandcastle generator 120 includes clipper shaper circuitry/logic 122 that receives a vertical retrace signal. The output of the clipper shaper 122 is summed via a summer 126 (summation circuitry/logic) with a horizontal flyback signal. Alternatively, either the vertical retrace signal or the horizontal flyback signal may be used without summation with the other. An input composite video and sync signal is input to sync separator circuitry/logic 124 to obtain a separated sync signal. The separated sync signal, or a portion thereof, is subtracted from the summed signal from the summer 126 to obtain the sandcastle signal 152 (FIG. 9).

Figure 7:
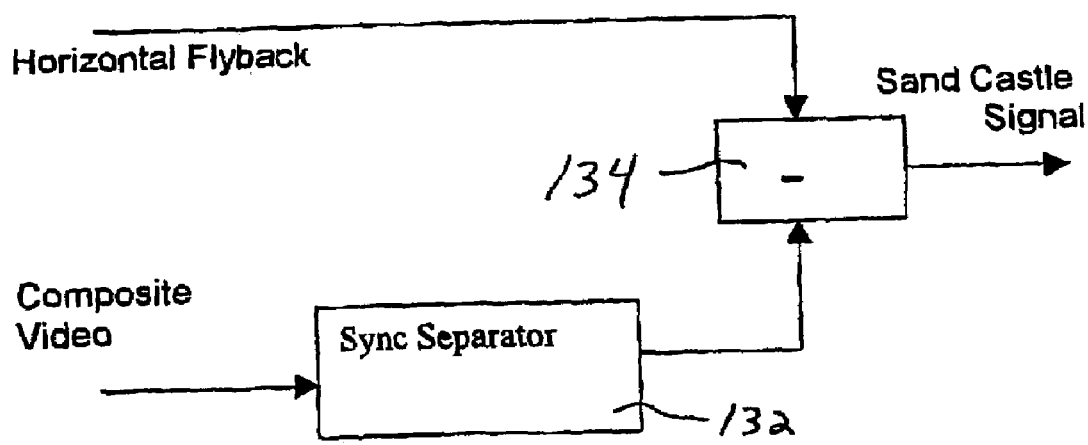
FIG. 7 is a block diagram of another implementation of a sandcastle generator in accordance with the principles of the present invention.

Referring to FIG. 7, there is shown another embodiment of a sandcastle signal generator in accordance with another aspect of the present invention. In some instances, it is not necessary to include the vertical blanking signal in the sandcastle signal, as does the embodiment of FIG. 6. In this case, the sandcastle generator, generally designated 130, may be used. A composite video and sync signal is provided to a sync separator 132 to obtain a separated sync signal. The separated sync signal, or a portion thereof, is subtracted from the horizontal flyback signal in a subtractor or subtractor circuitry/logic 134 to obtain a sandcastle signal as an output. As in all cases, the sandcastle signal is then utilized by the television signal receiver.

It is sometimes the case that a conventional sandcastle signal is used, but is not available during some instances of television receiver operation (functions), such as for example, during channel change (a television signal receiver-related function). It is then desirable in these cases to utilize the presently generated sandcastle signal in addition to a typical sandcastle signal, utilizing the control circuitry to switch between them at the appropriate instances.

Figure 8:
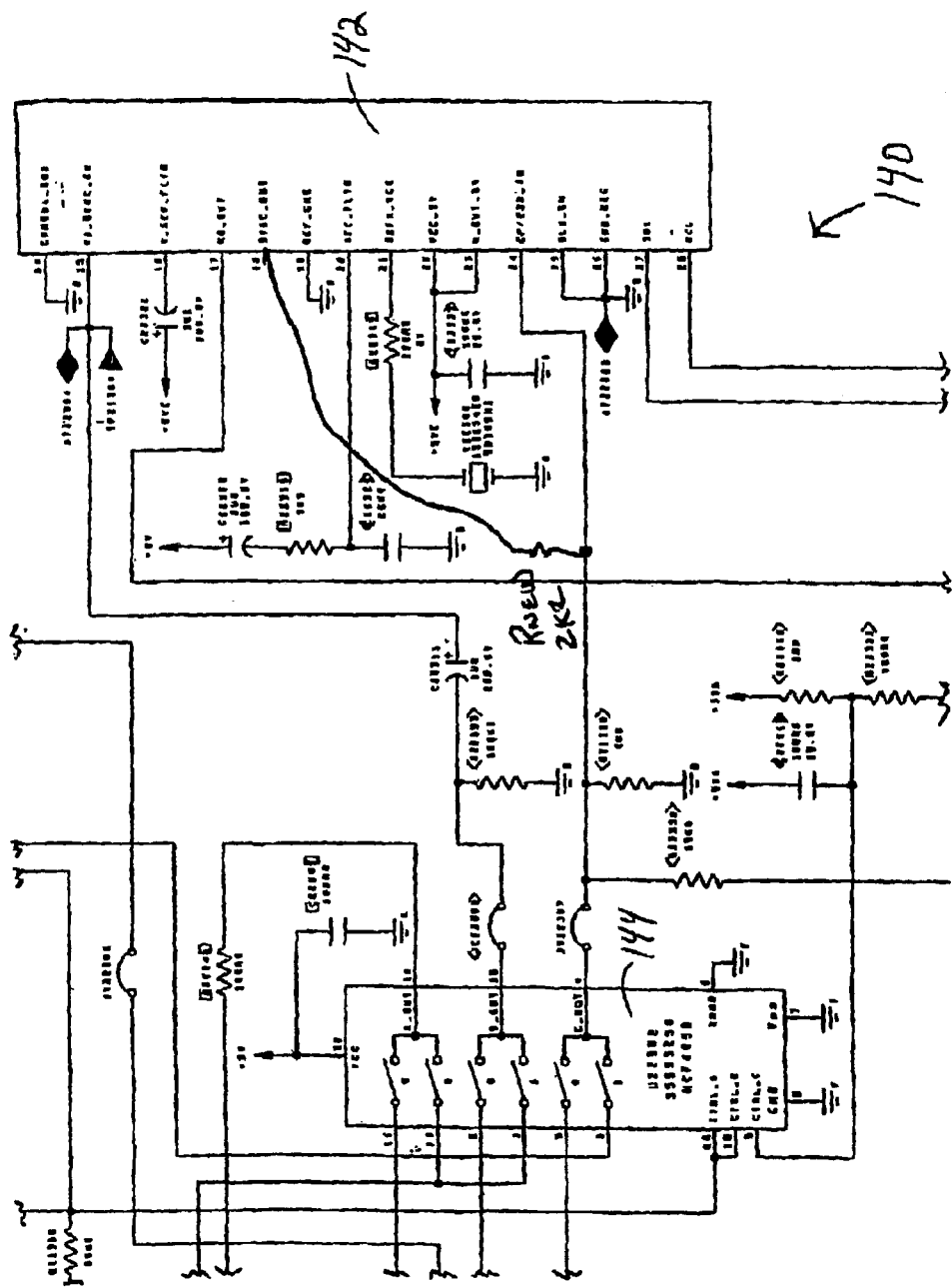
FIG. 8 is a portion of a circuit diagram of a specific implementation of the present invention.

Referring to FIG. 8, there is depicted a partial schematic, generally designated 140, of a specific implementation of the present invention. An integrated circuit (IC) 142 is provided that is a general television signal processor. The IC 142 receives an attenuated deflection (flyback) signal from IC 144 as an input to a black stretch/clamp key input, pin 24, (CP/BSB_IN). A sync separator output, pin 18 on IC 142, from a sync separator of the IC 142, is additionally coupled to the black stretch/clamp key input, pin 24, via a resistor $R_{NEW}$. This provides a sandcastle signal in accordance with the principles of the present invention to produce a simplified sandcastle signal containing a suppressed clamping pulse (see FIG. 11).

Referring to FIG. 9, there is depicted combining circuitry/logic, generally designated 160, for the integrated circuit 142 of FIG. 8. Particularly, a generator/source 162 provides a deflection retrace signal. A separated sync signal is provided to a transistor 164. The deflection retrace signal and the separated sync signal are combined at a node/connection of a resistor 166 and the R$_{NEW}$ (i.e. resistor 168). The resulting combined signal is the present sandcastle signal.

Figure 10:
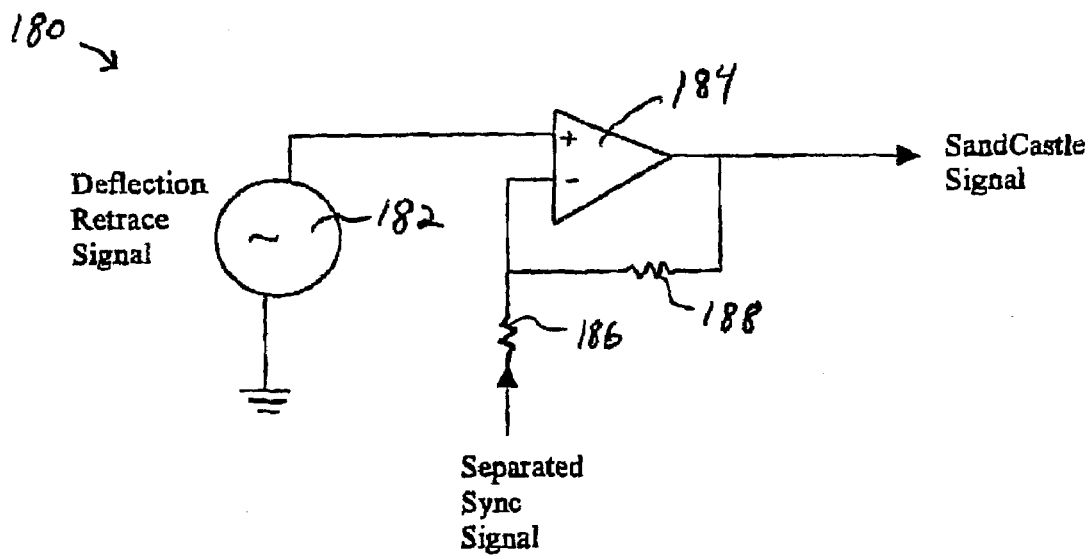
FIG. 10 is a simplified circuit diagram of another exemplary manner of generating a sandcastle signal in accordance with the principles presented herein.

In FIG. 10, the subtraction of a portion of the separated sync from the deflection retrace signal can be accomplished with the circuitry/logic generally designated 180. The deflection retrace signal is provided by a generator/source 182, the output of which is provided to a "+" input of a comparator 184. The separated sync signal is provided to the "−" input of the comparator after passing through the resistor 186. The output of the comparator 184 is also provided to the "−" input of the comparator 184 (feedback). As well, the output of the comparator 184 provides the present sandcastle signal.

Figure 11:
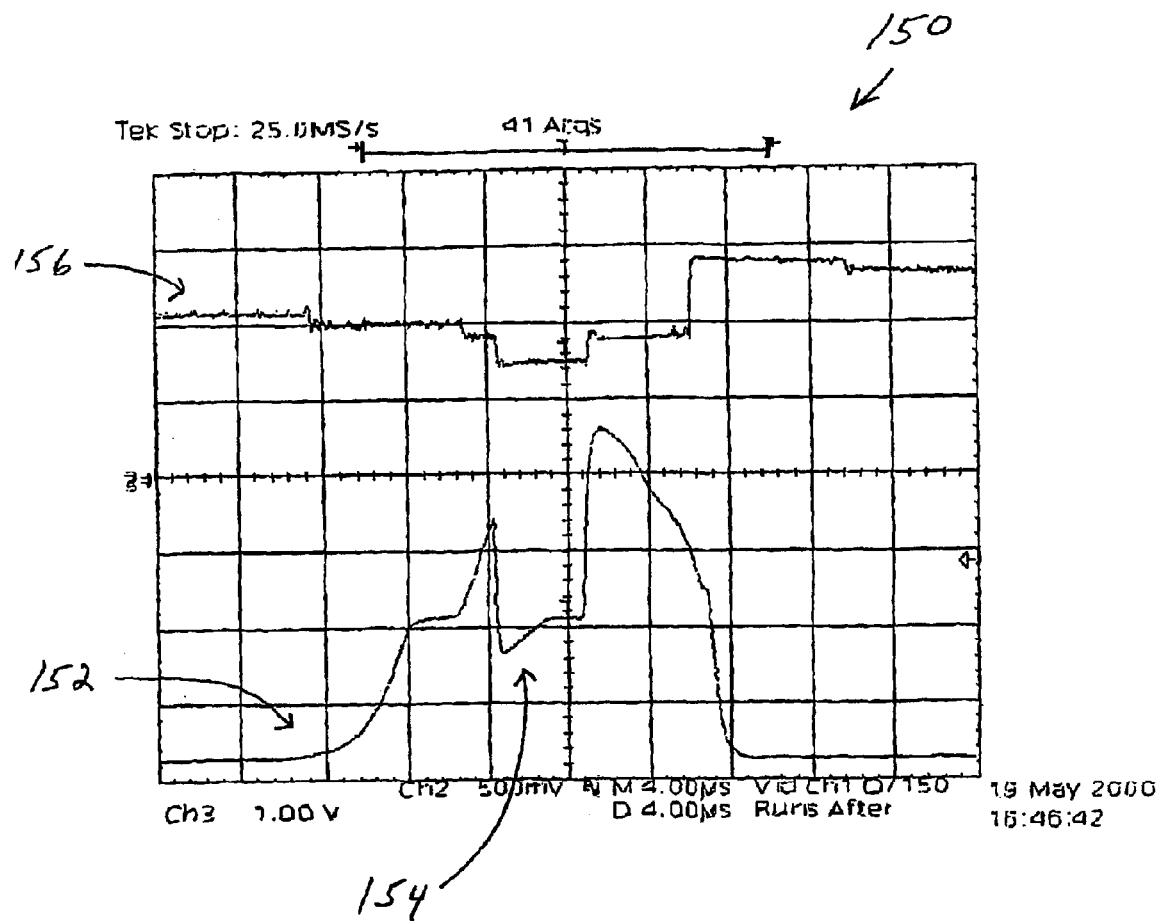
FIG. 11 a chart or diagram of an exemplary waveform in accordance with the principles of the present invention.

In FIG. 11, a graph, generally designated 150, is shown of a sandcastle signal 152 (a combined clamping and black stretch disable signal) waveform. The sandcastle signal 152 has a notch 154 (lower voltage interval) within the waveform. Also shown is a video signal 156 waveform in timing relationship to the sandcastle signal 152. For this particular sandcastle signal 152, the notch 154 lowers the sandcastle signal 152 to about 1.8 volts. This is sufficiently above a black stretch detector defeat such that the black stretch functions correctly. During channel change (a television signal receiver-related function), the maximum voltage is approximately 2.2 volts for the notch 154. This keeps the clamp off, whose threshold is approximately 3.4 volts.

Figure 12:
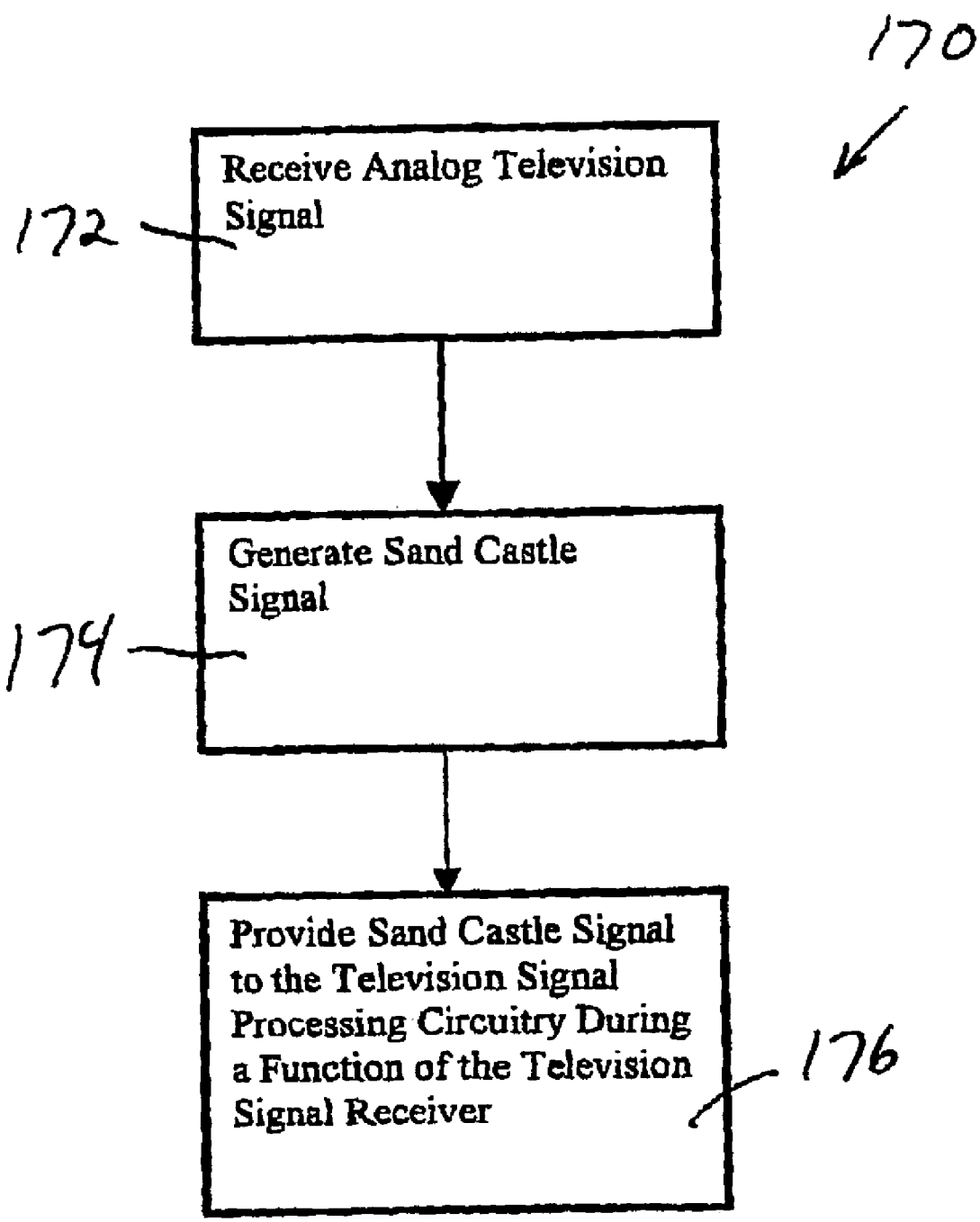
FIG. 12 is a flow chart of an exemplary manner of operation of the present invention.

Referring to FIG. 12, there is depicted a flow chart, generally designated 170, of an exemplary manner of operation of the present invention. In step 172, an analog television signal is received by a television signal processor/receiver. The television signal receiver processes the analog television signal and generates a sandcastle signal, step 174. The generated sandcastle signal is then provided to the television signal processing circuitry, especially during a time period or interval when the television signal receiver is performing or doing a particular television signal receiver-related function, step 176. The television signal receiver-related function may be a channel change or the like.

Figure 1:
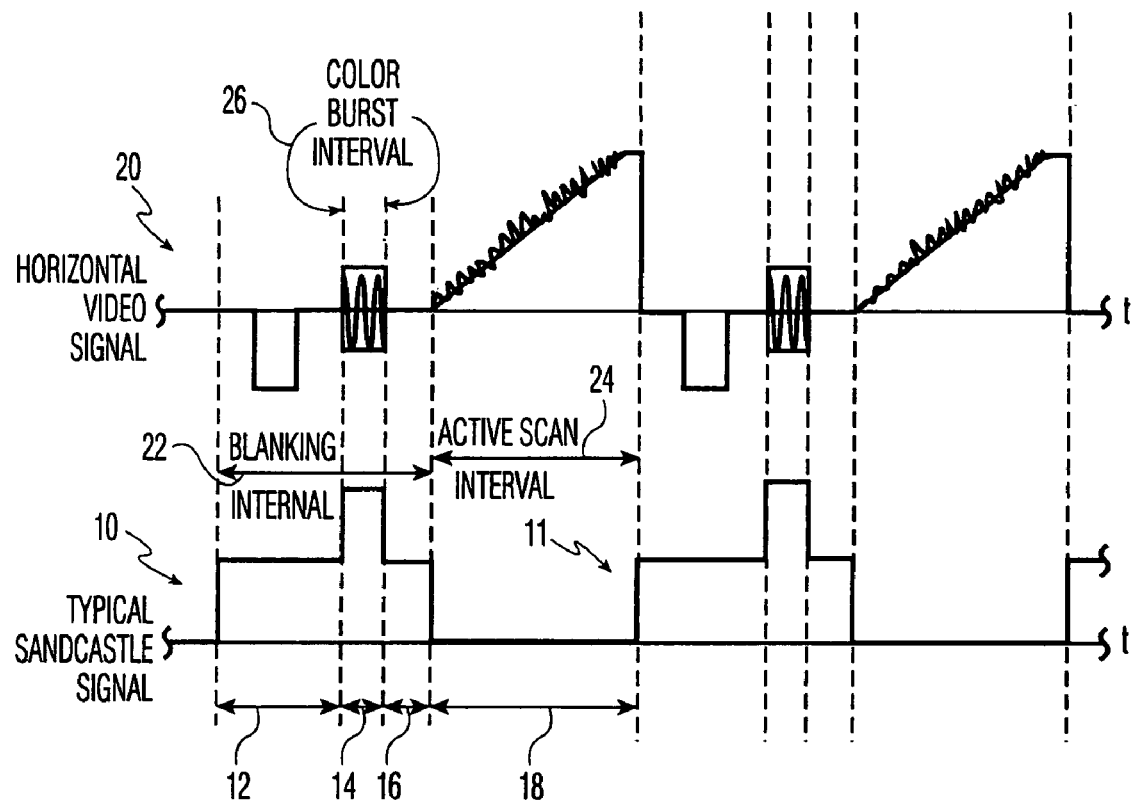
FIG. 1 is a graphic representation of a typical, prior art sandcastle signal and a typical horizontal video signal in timing relationship to one another.
Figure 2:
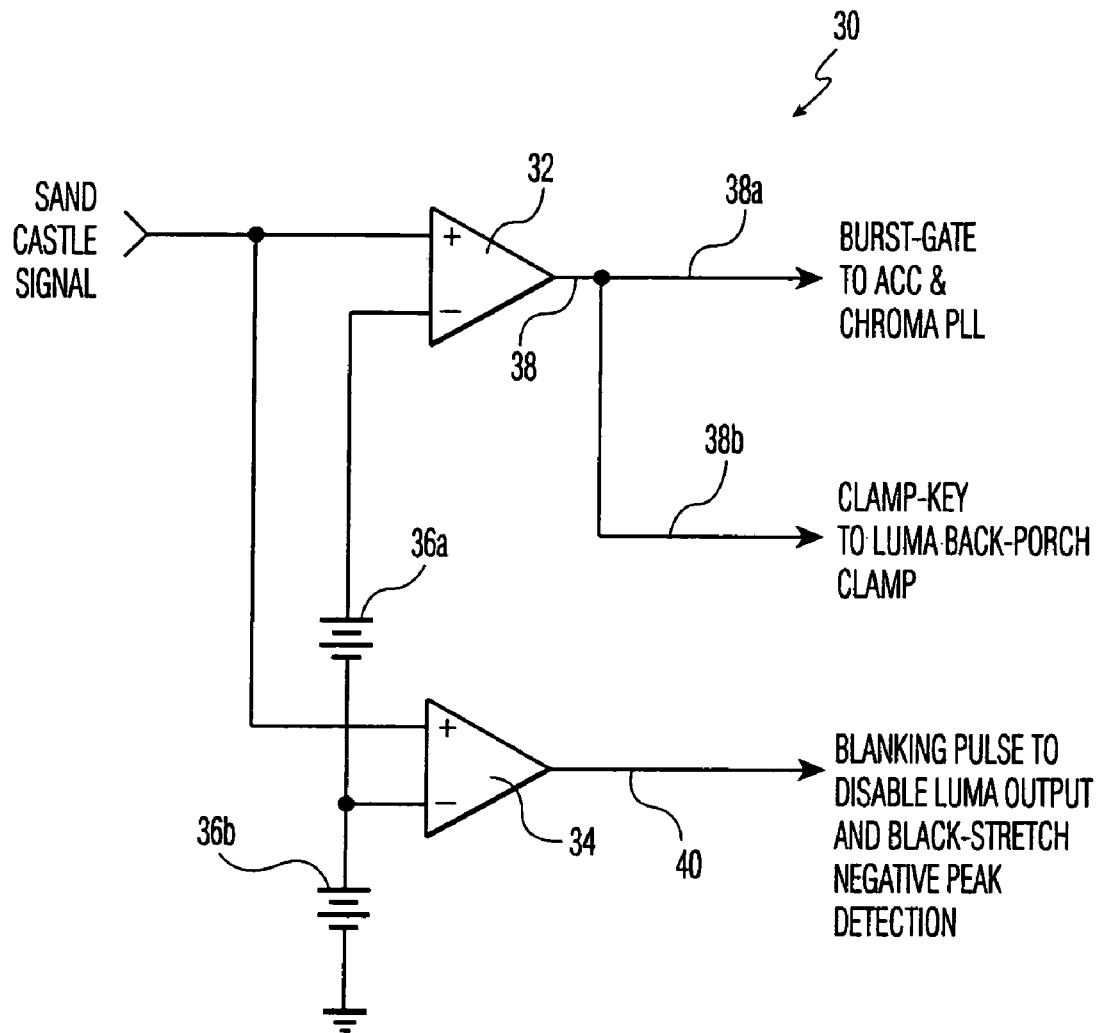
FIG. 2 is a simplified block diagram of a prior art manner of utilizing the sandcastle signal of FIG. 1.
Figure 3:
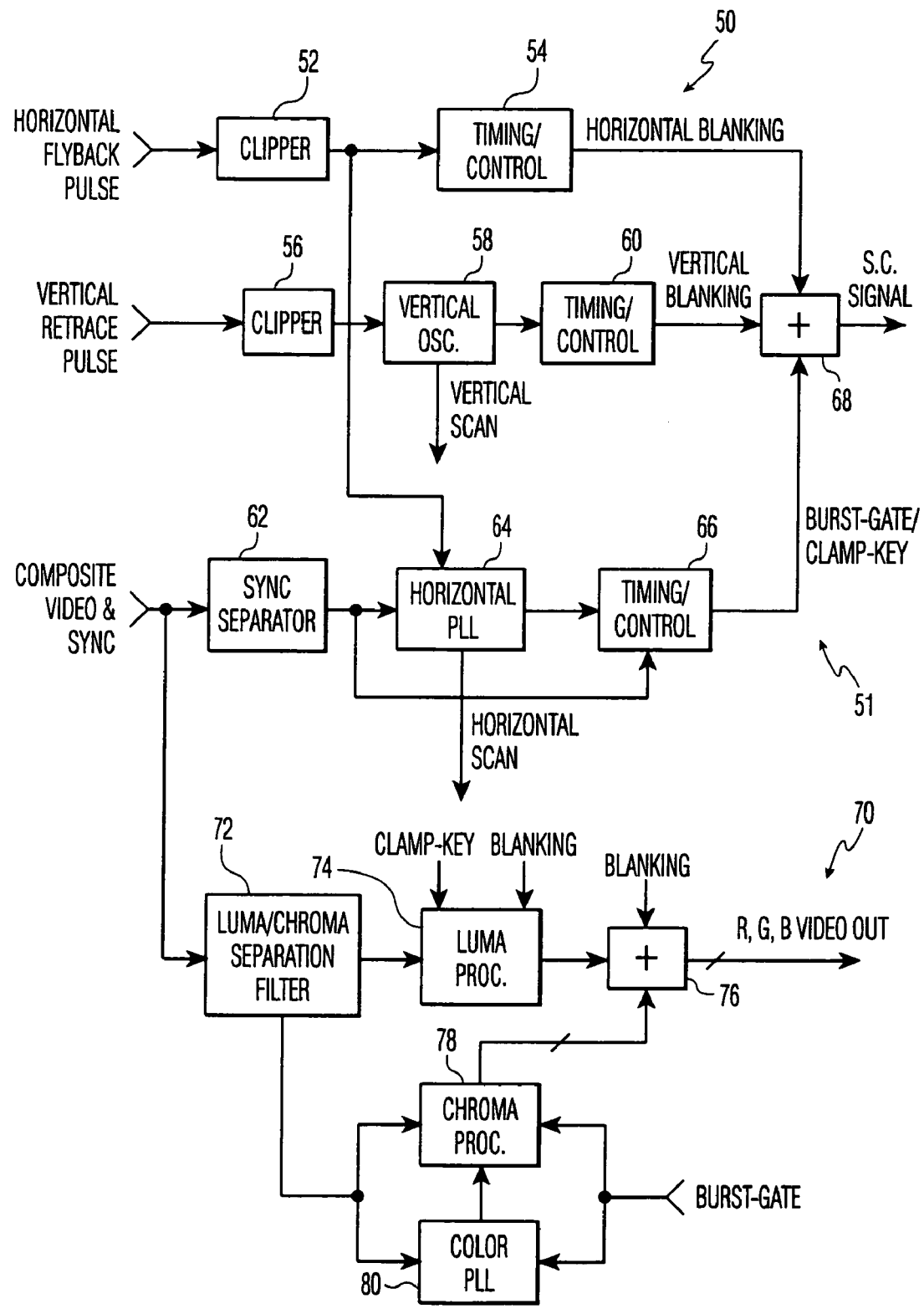
FIG. 3 is a block diagram of a prior art manner of generating and utilizing the sandcastle signal of FIG. 1 and of obtaining RGB video output signals.

The generated sandcastle signal may be used in place of a standard sandcastle signal (see FIG. 1), or may be selectively used in place of the standard sandcastle signal. This may occur when a particular function of the television signal receiver requires a modified sandcastle signal as herein provided. The television signal receiver may also use the present sandcastle signal for other purposes. While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

The invention claimed is:

1. An apparatus comprising:
    circuitry operative to provide an attenuated deflection retrace signal;
    circuitry operative to provide a separated synchronization signal; and
    circuitry operative to subtract a portion of the separated synchronization signal from the attenuated deflection retrace signal resulting in a compound signal, said compound signal defining a first timing interval when said compound signal exceeds a first amplitude threshold and a second timing interval when said compound signal exceeds a second amplitude threshold, said second amplitude threshold being greater than said first amplitude threshold and said second timing interval being contained within said first timing interval.

2. The apparatus of claim 1, wherein the attenuated deflection retrace signal comprises a horizontal flyback signal.

3. The apparatus of claim 1, wherein the attenuated deflection retrace signal comprises a vertical deflection retrace signal.

4. The apparatus of claim 1, wherein the attenuated deflection retrace signal comprises a horizontal flyback signal and a vertical retrace signal.

5. The apparatus of claim 1, further comprising:
    signal processing circuitry; and
    control circuitry operative to provide the generated compound signal to the signal processing circuitry during performance of a function of the apparatus.

6. The apparatus of claim 5, wherein the apparatus comprises a television signal receiver and the function of the apparatus comprises a television signal receiver-related function.

7. The apparatus of claim 6, wherein the television signal receiver-related function comprises changing the channel.

8. A method of generating a signal in a television signal receiver, comprising the steps of:
    generating an attenuated deflection retrace signal derived from a television signal;
    providing a separated synchronization signal derived from the television signal; and
    subtracting a portion of the separated synchronization signal from the attenuated deflection retrace signal to result in a compound signal, said compound signal defining a first timing interval when said compound signal exceeds a first level threshold and a second timing interval when said compound signal exceeds a second level threshold, said second level threshold being greater than said first level threshold and said second timing interval being contained within said first timing interval.

9. The method of claim 8, wherein the step of generating an attenuated deflection retrace signal comprises generating a horizontal flyback signal.

10. The method of claim 8, wherein the step of generating an attenuated deflection retrace signal comprises generating a vertical retrace pulse.

11. The method of claim 8, wherein the step of generating an attenuated deflection retrace signal comprises summing a horizontal flyback signal and a vertical retrace signal.

12. The method of claim 8, further comprising the steps of:
    providing the resultant compound signal to signal processing circuitry of the television signal receiver during performance of a function of the television signal receiver.

13. The method of claim 12, wherein the function comprises changing the channel.

14. A television signal receiver comprising:
    means for providing an attenuated deflection signal;

means for providing a separated synchronization signal; and means for subtracting a portion of the separated synchronization signal from the attenuated deflection signal, resulting in a compound signal, said compound signal defining a first timing interval when said compound signal exceeds a first amplitude level threshold and a second timing interval when said compound signal exceeds a second amplitude level threshold, said second amplitude level threshold being greater than said first amplitude level threshold and said second timing interval being contained within said first timing interval.

15. The television signal receiver of claim 14, wherein the means for providing an attenuated deflection retrace signal comprises means for providing a horizontal flyback signal.

16. The television signal receiver of claim 14, wherein the means for providing an attenuated deflection retrace signal comprises means for providing a vertical deflection retrace signal.

17. The television signal receiver of claim 14, wherein the means for providing an attenuated deflection retrace signal comprises means for providing a horizontal flyback signal and a vertical retrace signal.

18. The television signal receiver of claim 14, further comprising:
 means for processing a television signal; and
 means for providing the generated compound signal to the means for processing a television signal during performance of a function of the television signal receiver.

19. The television signal receiver of claim 18, wherein the function of the television signal receiver comprises changing the channel.

\* \* \* \* \*